United States Patent [19]

Hamanaka

[11] Patent Number: 5,046,159
[45] Date of Patent: Sep. 3, 1991

[54] IMAGE TRANSMITTING ELEMENT AND PROCESS FOR PRODUCING SAME

[75] Inventor: Kenjiro Hamanaka, Osaka, Japan

[73] Assignee: Nippon Sheet Glass Co., Ltd., Osaka, Japan

[21] Appl. No.: 611,601

[22] Filed: Nov. 13, 1990

[30] Foreign Application Priority Data

Nov. 24, 1989 [JP] Japan ................... 1-305893

[51] Int. Cl.$^5$ ............... G03B 27/00; H01J 40/14; H04N 3/14; H04N 5/335
[52] U.S. Cl. ................. 355/001; 250/208.1; 358/213.13; 358/484; 385/33; 385/133
[58] Field of Search ............. 350/127, 96.18, 96.28, 350/96.34, 96.10; 355/1, 46, 50; 250/227.11, 208.1; 358/213.13, 484, 494

[56] References Cited

U.S. PATENT DOCUMENTS

| | | | |
|---|---|---|---|
| 4,275,962 | 6/1981 | Midorikawa et al. | 355/1 |
| 4,472,046 | 9/1984 | Kohyama | 355/1 |
| 4,539,482 | 9/1985 | Nose | 250/208.1 |
| 4,733,096 | 3/1988 | Horiguchi | 358/213.13 |
| 4,759,603 | 7/1988 | Jones | 350/96.28 |
| 4,767,172 | 8/1988 | Nichols et al. | 350/96.18 |
| 4,874,957 | 10/1989 | Sasaki et al. | 250/208.1 |
| 4,942,481 | 7/1990 | Yoshinouchi et al. | 358/484 X |

Primary Examiner—Richard A. Wintercorn
Attorney, Agent, or Firm—Sughrue, Mion, Zinn, Macpeak & Seas

[57] ABSTRACT

An image transmitting element and a process for producing the same are disclosed, which image transmitting element comprises: a transparent substrate; photo-transmissible holes one-dimensionally or two-dimensionally formed as an array in the transparent substrate, each of the holes having one end opened at one surface of the substrate and the other end made blind and provided with a substantially spherical top end within a thickness of the substrate; a photo-absorptive surface formed on at least a part of an inner surface of each of the photo-transmissible holes except the surface of the spherical top end thereof; and a transparent material with which the photo-transmissible holes are filled, the transparent material having a refractive index higher than that of the substrate.

2 Claims, 3 Drawing Sheets

SECTION 10.-10.'

SECTION 10.-10.'

IMAGE TRANSMITTING ELEMENT AND PROCESS FOR PRODUCING SAME

FIELD OF THE INVENTION

The present invention relates to an image transmitting element for optically transmitting and focusing one-dimensional or two-dimensional image information, and particularly relates to an image transmitting element which is useful for transmitting and focusing an image of an original document onto a contact type image sensor in a copying machine, a facsimile, an image scanner, or the like, or transmitting and focusing a light signal from a luminous body array onto a photosensitive drum in an LED printer or the like.

BACKGROUND OF THE INVENTION

A lens array (hereinafter abbreviated to "SLA") constituted by a number of parabolic refractive index distributing rod lenses which are arrayed to make their optical axes parallel has been used broadly to focus one-dimensional image information on the surface of an original document onto a contact type image sensor.

Recently, it has been performed to use a so-called "perfect contact type image sensor" which is constituted by a contact type image sensor having light leading windows, so that an illuminating light source placed at the back side of this image sensor illuminates an original document though the light leading window, and an array of photo-detecting portions disposed close to the light leading windows detect reflected light from the original document. In such a case, the contact sensor and the original document are disposed so close without using an SLA.

On the other hand, in an LED or liquid crystal printer, an SLA has been used to transmit, onto a photosensitive drum, light information expressed by the flashing of an LED array or the switching of a liquid crystal shutter array.

However, an SLA needs at least about 15 mm as a so-called focal length between a one-dimensional image information surface and a focusing surface, so that this value is a limit to miniaturize an apparatus using the SLA.

On the other hand, since the perfect contact type image sensor has no focusing system such as a lens or the like, there has been a problem that image information is faded on an image sensor if the distance between the image sensor and an original document becomes large even slightly. It is therefore necessary to make a sensor surface always contact with an original document, so that there has been a problem that the sensor surface is apt to be injured.

SUMMARY OF THE INVENTION

It is therefore an object of the present invention to solve the foregoing problems in the prior art.

It is another object of the present invention to provide an image transmitting element in which no fading of an image signal due to cross talk occurs so that a clear image having high resolution can be obtained accurately.

It is still another object of the present invention to provide a process for producing such an image transmitting element.

The present invention relates to an image transmitting element comprising: a transparent substrate; photo-transmissible holes one-dimensionally or two-dimensionally formed as an array in the transparent substrate, each of the holes having one end opened at one surface of the substrate and the other end made blind and provided with a substantially spherical top end within a thickness of the substrate; a photo-absorptive surface formed on at least a part of an inner surface of each of the photo-transmissible holes except the surface of the spherical top end thereof; and a transparent material with which the photo-transmissible holes are filled, the transparent material having a refractive index higher than that of the substrate.

The present invention also relates to a process for producing the above image transmitting element, comprising steps of: providing on one surface of each of a pair of transparent substrates an anti-corrosive mask film; forming an array of slit openings in parallel to each other, the respective end portions of the slit openings being positioned in the inside of the side edge of the substrate; contacting an etching material to the surface of the substrate on which the mask film is provided so as to etch the surface of the substrate isotropically from the slit openings to thereby form an array of grooves each having substantially spherical opposite end surfaces; providing a photo-absorptive surface on at least a part of an inner wall of each of the grooves except the spherical opposite end surfaces thereof; removing the mask film; filling the grooves with a transparent material having a refractive index higher than that of the substrate; joining the pair of substrates each having the grooves to each other in a manner such that the grooves of one of the pair of substrates are made to accord with the grooves of the other of the pair of substrate; and cutting the joined body of the substrates at a position crossing the array of the grooves.

The arrangement pitch of the photo-transmissible holes is made to accord with that of a contact-type image sensor or an LED array to be used in combination with the image transmitting element of the present invention.

In use, for example, the image sensor is placed on the hole opening surface of the image transmitting element so that the array of holes and the array of sensor elements of the image sensor have one-to-one correspondence therebetween, and an original document surface is arranged on the other surface side of the image transmitting element. Accordingly, the illuminating light reflected from the very small areas on the original document surface is incident the surface of the substrate of the image transmitting element substrate and then focusedly incident into the holes corresponding to the very small areas of the original document surface through the convex lens effect of the respective spherical top end portions of the holes. Thus, the light is accurately incident into each of corresponding sensor elements of the image sensor. The noise light obliquely traveling towards the adjacent holes are absorbed by the photo-absorptive surface provided on the respective inner wall of the holes.

Accordingly, image detection can be performed very accurately with little cross talk. Further, an image having high resolution can be formed on a photosensitive drum by use of an LED array in place of the image sensor and by use of a photosensitive drum surface in place of the original document surface.

Other features and advantages of the present invention will be apparent from the following description} taken in connection with the accompanying drawings, wherein:

BRIEF DESCRIPTION OF THE DRAWINGS

FIGS. 3 through 5 are views for explaining one embodiment of the process for producing an image transmitting element according to the present invention, in which FIG. 3 is a plan view and a transversal section showing the state in which a mask film having an array of slit openings for etching is formed on a substrate, FIG. 4 is a plan view and a transversal view showing the state of the substrate after etching, and FIG. 5 is a sectional view showing an image transmitting element obtained by joining a pair of substrates each having grooves to each other and then cutting the joined body of the substrates;

DETAILED DESCRIPTION OF PREFERRED EMBODIMENT

Figure 1:
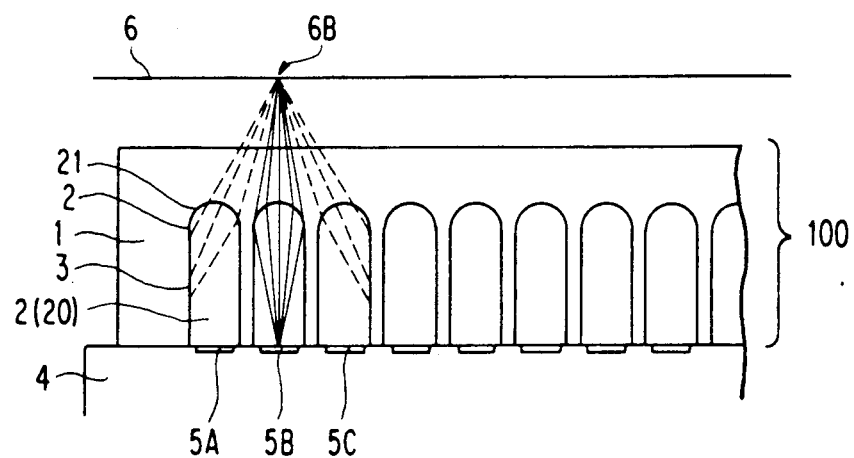
FIG. 1 is a vertical section showing the image transmitting element according to one embodiment of the present invention.

Referring to the drawings, an embodiment of the image transmitting element according to the present invention will be described hereunder.

Figure 2:
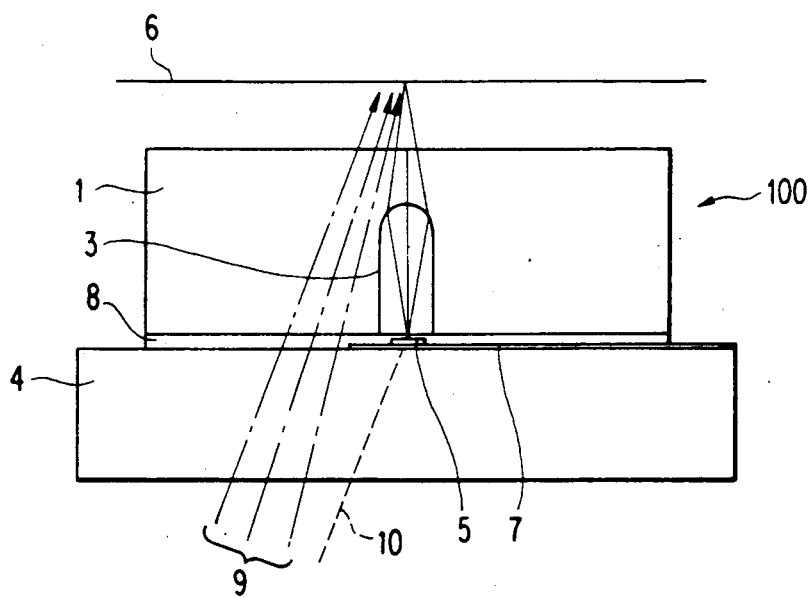
FIG. 2 is a cross section of the image transmitting element shown in FIG. 1.

FIGS. 1 and 2 are a vertical section and a cross section respectively which show an example in which an image transmitting element 100 according to the present invention is combined with a contact type image sensor 4 (hereinafter referred to as "contact sensor") so as to constitute an apparatus for detecting one-dimensional image information on an original document surface 6.

The image transmitting element 100 is arranged such that a number of substantially cylindrical photo-transmissible holes whose end portions have a focusing function are formed one-dimensionally at predetermined intervals in the thickness of a transparent substrate 1 made of, for example, a glass (e.g., alkali-free glass, quartz glass, soda-lime glass) or plastic (e.g., UV or heat curable acrylic resins, polymethyl methacrylate, polycarbonate) having a flat surface.

The photo-transmissible holes 2 each having a very small diameter is provided in the substrate in such a manner that one end opens on one surface side of the substrate 1, and the other blind end which is made so as not to penetrate through the substrate but is stopped while leaving a small thickness of the substrate. A top end 21 of each of the holes 2 is formed so as to be substantially spherical, a photo-absorptive coating film 3 of a black paint is formed on at least a part of an inner side surface of each of the holes 2 except the spherical top end 21 thereof, and the interiors of the holes 2 is filled with a transparent material 20 such as transparent resin (e.g., light or heat curable acrylic resins, epoxy resins) or the like having a refractive index higher than that of the substrate 1.

The photo-transmissible holes 2 are previously formed at predetermined intervals corresponding to the intervals of sensor elements 5A, 5B, 5C, etc. of the contact sensor 4. The image sensor 4 and the image transmitting element 100 are combined to each other through a transparent adhesive layer 8 in such a manner that the holes 2 and the sensor elements 5 are arranged so as to have one-to-one correspondence.

The contact sensor 4 is formed in a manner so that almost one half area of the surface of a transparent substrate is covered with a photo-shield layer 7 and sensor elements 5 are one-dimensionally arrayed on the upper surface of and near the inner side edge of the photo-shield layer 7.

An illuminating light source is disposed at the back side of the contact sensor 4 so that the original document surface 6 is irradiated with illuminating light 9 through a not-photo-shield portion of the sensor substrate.

At this time, light rays 10 toward the sensor element 5 are cut by the photo-shield layer 7.

The light reflected from the original document surface 6 (rays illustrated by solid lines in FIGS. 1 and 2) is incident into the photo-transmissible hole through the corresponding spherical top ends 21 and then focusedly incident into the corresponding sensor elements 5A, 5B, 5C, etc. of the contact sensor.

At this time, since the interior of each of the photo-transmissible holes 2 is filled with the transparent material 20 having a refractive index higher than that of the substrate 1, the spherical top end 21 of each of the holes 2 functions as a convex lens.

The incident light is bent inwards owing to the convex lens effect so as to be incident effectively into each of the sensor elements 5A, 5B, 5C, etc. On the other hand, the light obliquely reflected and scattered from the original document surface 6 in the oblique direction (rays illustrated by dotted lines in FIG. 1) is indeed incident into the adjacent photo-transmissible holes 2, which are not corresponding holes, but the inner walls of the photo-transmissible holes 2 have the photo-absorptive surface 3, so that the obliquely reflected and scattered light cannot reach any of the sensor elements 5 of the contact sensor 4.

That is, the light (the rays illustrated by the solid lines in FIGS. 1 and 2) which is reflected from each of the very small area on the original document surface positioned just above the corresponding sensor element 5, for example, from an area 6B just above the sensor element 5B in FIG. 1, is incident into the corresponding sensor element 5 efficiently through the lens effect of the spherical top end 21 of the corresponding photo-transmissible hole 2.

Consequently, respective points in a one-dimensional area on the original document surface 6 have one-to-one correspondence to the respective sensor elements of the contact sensor 4 so as to realize clear one-dimensional image transmission with no cross talk light leaking to adjacent picture elements.

Although a wiring pattern, a switching transistor (TFT), a surface protecting coating, etc. are provided on the surface of the contact sensor 4, those parts have no direct relation with the present invention and therefore they are omitted in FIGS. 1 and 2 for the sake of simplification.

Figure 3A:
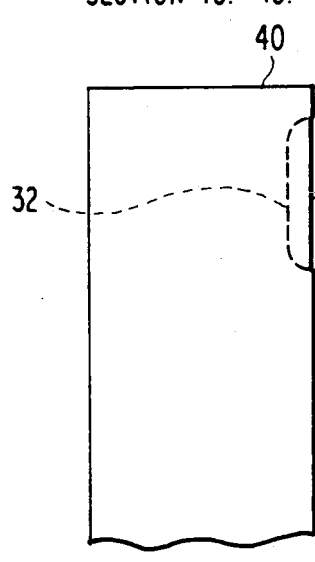
Figure 3B:
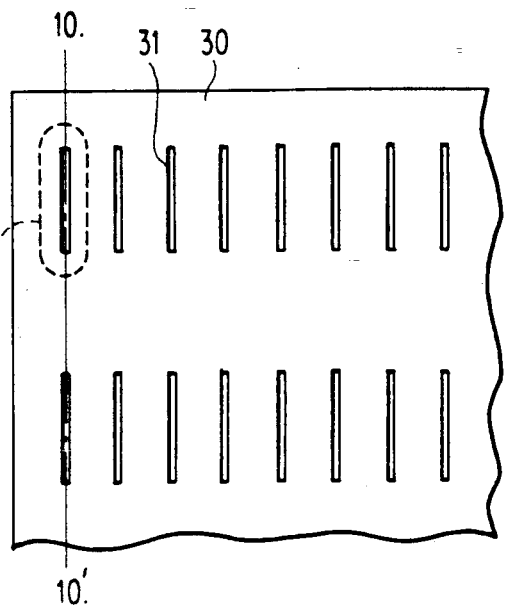
Figure 4A:
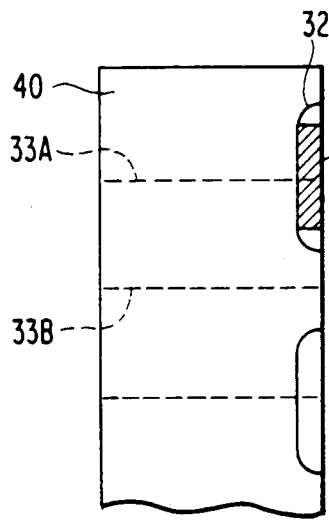
Figure 4B:
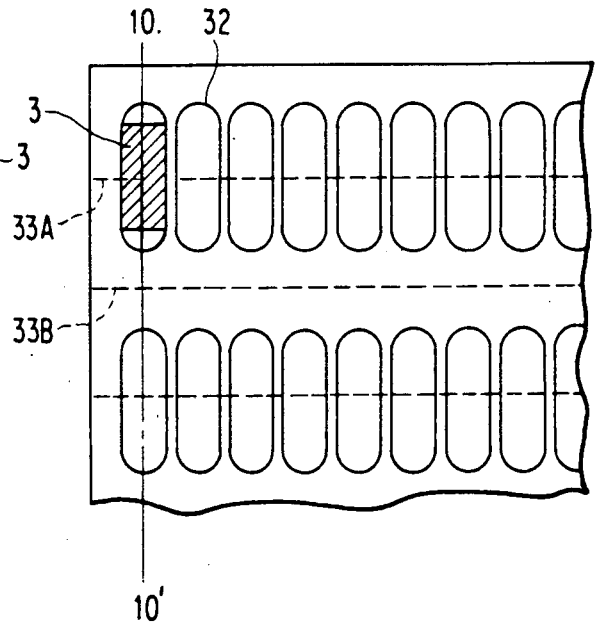
Figure 5:
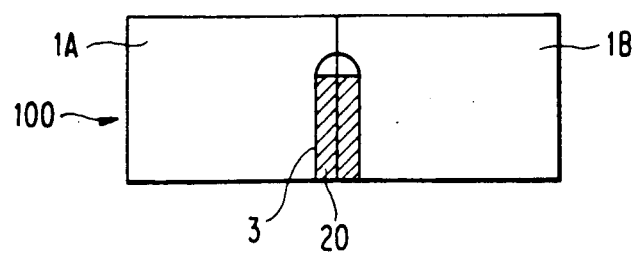

Referring to FIGS. 3 through 5, a preferred embodiment of the process for producing the image transmitting element according to the present invention will be described hereunder.

First, as shown in FIG. 3, a surface of a transparent glass substrate 40 is coated with a mask film 30 composed of a material such as Cr which is anti-corrosive against a glass etching liquid to be used in a later etching step. A number of rows each having a number of elongated slit openings 31 are formed in the mask film 30 at predetermined intervals by use of a well-known photolithographic process. The number of elongated slit openings 31 is one-directionally formed at predetermined intervals the same as those of the photo-transmissible holes 2.

An end portion of each of the slit openings is made blind so as to stop in the inside of the side edge of the substrate 40.

By immersing the above-mentioned glass substrate having the mask film into a glass etching liquid having a main component such as fluoric acid, etching starts from the slit openings 31 in the mask film so that the glass substrate 40 is etched substantially isotropically from the surface of the glass substrate into the interior thereof and grooves 32 each having substantially semi-spherical opposite ends and a substantially semi-cylindrical middle portion are obtained as illustrated by the dotted lines in FIG. 3.

Next, after the mask film 30 has been removed by etching, the middle portion of the inner wall surface of each of the grooves 32 except the opposite semi-spherical portions is coated with a black paint so as to form the photo-absorptive coating film 3.

In order to coat the black paint on the limited specific area as described above, for example, a photo resist is provided with a pattern by a conventional photo lithography technique, then the whole of the surface is coated with the black paint, and then the photo resist is removed so as to leave the black paint only at the necessary portions.

A pair of grooved substrates produced in such a manner as described above is made to be opposite to each other so that the grooves 32 of one of the grooved substrates are made to accord with the corresponding grooves 32 of the other of the grooved substrates. The pair of grooved substrates is made accurately accord in position with each other and bonded to each other by using an adhesive agent. The adhesive agent is transparent after being hardened and has a refractive index higher than that of the substrate 40.

At this time, the grooves 32 are filled with the adhesive agent before bonding so that the adhesive agent becomes the transparent material 20 filled in the photo-transmissible holes 2 in the image transmitting element 100. After the adhesive agent has been hardened, the joined body is cut along a cutting line 33A perpendicular to the row of grooves at a longitudinally central position of the grooves and also along a cutting line 33B dividing the groove row.

Each of elongated pieces cut through the method described above is the image transmitting element 100 according to the present invention.

Although one embodiment has been described above, the present invention is not limited to the above embodiment but various modifications are possible. For example, it is possible that each of the grooves 32 of a pair of substrates is previously filled with a transparent material having a high refractive index (e.g., glass, resins), the surface of the filled transparent material is made flat by polishing, and then the pair of substrates are joined each other. Further, after the joined body of the substrates is cut along the cutting lines 33A and 33B, the cut surfaces of the joined substrate may be mirror-polished so as to improve the smoothness of the surfaces, or the cut surfaces may be coated with a transparent coating film such as a sol-gel film, a resin film, or the like, so as to make the surfaces smooth, without performing mirror-polishing.

In the case where the image transmitting element 100 is integrally bonded to the contact sensor 4 for use, it is preferred that the thermal expansion coefficients of the substrate materials of the image transmitting element 100 and the contact sensor 4 are the same as or substantially the same as each other.

For example, if the contact sensor 4 is made of #7059 glass (a trademark of Corning Co.) or quartz glass as its substrate, it is preferred that the same material is selected as the substrate material 1 of the image transmitting element 100.

However, if high accuracy is not necessary, a transparent resin material (e.g., UV or heat curable acrylic resin, polymethyl methacrylate, polycarbonate) may be is used as the image transmitting element 100.

It is not always necessary to coat the whole length of photo-transmissible holes 2 with the photo-absorptive coating film 3, and, for example, there is a case where it is sufficient if only the area of the length about from 60% to 80% of the whole length of the holes is coated.

It is not always necessary that the top end 21 having the light focusing function of the photo-transmissible holes accurately semi-spherical so long as the top end 21 has the effect for bending light inward of the photo-transmissible hole by refraction. That is, the top end 21 may be a shape of curved surface constituting a part of a sphere, a paraboloid of revolution, a hyperboloid of revolution, or the like, or a polyhedron such as a trapezoid.

Although FIGS. 1 and 2 show that the top end 21 accurately focus an original document surface onto a sensor element of a contact sensor, it is sufficient if reflected light from the original document surface is incident into the area of the sensor element.

Figure 6:
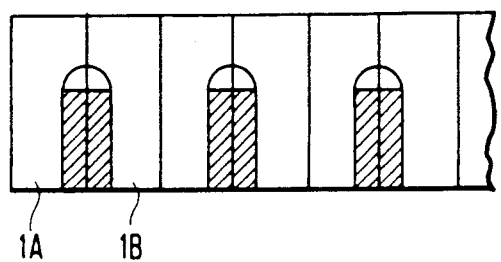
FIG. 6 is view for explaining one embodiment of the image transmitting element according to the present invention in which the photo-transmissible holes are formed two-dimensionally.
Figure 7:
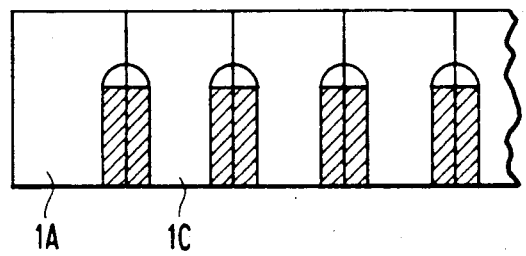
FIG. 7 is view for explaining another embodiment of the image transmitting element according to the present invention in which the photo-transmissible holes are formed two-dimensionally.

The image transmitting element according to the present invention in which the photo-transmissible holes are formed two-dimensionally as an array can be produced in the manner described in FIGS. 6 and 7 but is not restricted thereto.

In one embodiment shown in FIG. 6, a number of image transmitting element each composed of a pair of members 1A and 1B produced by the above-described process are stacked along the longitudinal direction thereof to form a two-dimensional array of the photo-transmissible holes.

In another embodiment shown in FIG. 7, the image transmitting element is composed of a member having grooves on one surface thereof 1A and a number of members each having grooves on both surfaces thereof 1C. In this embodiment, the intervals of the photo-transmitting holes can be reduced in comparison to the embodiment shown in FIG. 6.

Although the case where the image transmitting element 100 according to the present invention is combined with the contact sensor has been described in the above embodiment, the image transmitting element 100 may be combined with an LED array in place of the contact sensor to thereby constitute an optical system of an LED printer or combined with a liquid crystal shutter array to thereby constitute an optical system of a liquid crystal printer.

By use of the image transmitting element according to the present invention, it is possible to make an optical system such as a contact type image sensor, an LED printer and the like extremely small. For example, the distance between an original document surface and a light sensor surface becomes about from 0.6 to 2.0 mm.

At this time, even if there is a gap about not more than 1 mm between the original document surface and the image transmitting element, since light traveling in the direction toward the adjacent picture elements is intercepted by the photo-absorptive surfaces of the inner walls of the respective photo-transmissible holes in the image transmitting element, there is no fading of an image signal due to cross talk so that a clear image of high resolution can be obtained. That is, there are advantages that the depth of focus can be made comparatively large and that the surface is hard to be injured because of not-contact.

Moreover, although in a perfect contact type image sensor, the size of illuminating light leading windows corresponding to respective picture elements cannot be made large for the sake of keeping resolution so that the transmitting efficiency of the illumination to an original document surface becomes low, there is not such a limitation in the image transmitting element according to the present invention, and for example, as shown in the embodiment in FIG. 2, it is possible to lead illuminating light to an original document from the back side of the image transmitting element 100 and the contact sensor 4 efficiently, so that it is possible to improve the utilization efficiency of illumination.

While the invention has been described in detail and with reference to specific examples thereof, it will be apparent to one skilled in the art that various changes and modifications can be made therein without departing from the spirit and scope thereof.

WHAT IS CLAIMED IS:

1. An image transmitting element comprising:
   a transparent substrate;
   photo-transmissible holes one-dimensionally or two-dimensionally formed as an array in said transparent substrate, each of said holes having one end opened at one surface of said substrate and the other end made blind and provided with a substantially spherical top end within a thickness of said substrate;
   a photo-absorptive surface formed on at least a part of an inner surface of each of said photo-transmissible holes except the surface of said spherical top end thereof; and
   a transparent material with which said photo-transmissible holes are filled, said transparent material having a refractive index higher than that of said substrate.

2. A process for producing an image transmitting element as in claim 1, comprising steps of:
   providing on one surface of each of a pair of transparent substrates an anti-corrosive mask film;
   forming an array of slit openings in parallel to each other, the respective end portions of said slit openings being positioned in the inside of the side edge of said substrate;
   contacting an etching material to the surface of said substrate on which said mask film is provided so as to etch the surface of said substrate isotropically from said slit openings to thereby form an array of grooves each having substantially spherical opposite end surfaces;
   providing a photo-absorptive surface on at least a part of an inner wall of each of said grooves except said spherical opposite end surfaces thereof;
   removing said mask film;
   filling said grooves with a transparent material having a refractive index higher than that of said substrate;
   joining said pair of substrates each having said grooves to each other in a manner such that said grooves of one of said pair of substrates are made to accord with said grooves of the other of said pair of substrate; and
   cutting said joined body of said substrates at a position crossing said array of said grooves.

* * * * *